United States Patent
Schwarzmeier et al.

(10) Patent No.: US 12,464,438 B2
(45) Date of Patent: Nov. 4, 2025

(54) METHODS, APPARATUS, AND SYSTEM

(71) Applicant: Robert Bosch GmbH, Stuttgart (DE)

(72) Inventors: Andre Schwarzmeier, Reutlingen (DE); Andreas Schaller, Reutlingen (DE); Frank Hofmann, Hildesheim (DE); Khaled Shawky Hassan, Laatzen (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 694 days.

(21) Appl. No.: 17/508,288

(22) Filed: Oct. 22, 2021

(65) Prior Publication Data
US 2022/0132405 A1 Apr. 28, 2022

(30) Foreign Application Priority Data
Oct. 23, 2020 (EP) .................................. 20203638

(51) Int. Cl.
*H04W 4/00* (2018.01)
*H04W 4/44* (2018.01)
*H04W 48/08* (2009.01)
*H04W 48/16* (2009.01)

(52) U.S. Cl.
CPC ............. *H04W 48/16* (2013.01); *H04W 4/44* (2018.02); *H04W 48/08* (2013.01)

(58) Field of Classification Search
CPC ................................ H04W 48/16; H04W 4/44
USPC ........................................................ 370/329
See application file for complete search history.

(56) References Cited

U.S. PATENT DOCUMENTS

2019/0387564 A1* 12/2019 Kim ...................... H04W 76/14
2023/0298468 A1* 9/2023 Jha ......................... G08G 1/164
701/117

FOREIGN PATENT DOCUMENTS

EP 3471075 A1 4/2019
KR 20180058436 A 6/2018

* cited by examiner

*Primary Examiner* — Temica M Beamer
(74) *Attorney, Agent, or Firm* — Michael Best & Friedrich LLP

(57) ABSTRACT

A portable electronic device (UEa) that includes determining means to determine a coupling state that indicates a coupling or non-coupling of the portable electronic device with a vehicle-side control unit of a lightweight vehicle; and selecting means to select one of at least a first and second VRU class of the portable electronic device based on the determined coupling state.

14 Claims, 5 Drawing Sheets

METHODS, APPARATUS, AND SYSTEM

BACKGROUND OF THE INVENTION

The description concerns advances in communication and control of lightweight vehicles.

SUMMARY OF THE INVENTION

According to a first aspect, a method for operating an apparatus comprises: determining a coupling state that indicates a coupling or non-coupling of the apparatus with a vehicle-side control unit of a lightweight vehicle; and selecting one of at least a first and second VRU class of the apparatus based on the determined coupling state.

Advantageously, the proposed scheme allows a UE/the apparatus to switch between two or more VRU classes or categories, i.e., pedestrian status and lightweight vehicle status. The case can be identified by the status of the UE, i.e., whether the UE is a pure pedestrian UE or connected to an e-mobility device in the sense of the control unit. Advantageously, new multi-power classes can be made available to the same user depending on coupling status of the apparatus, in charging mode or not, according to mobile entity battery and RAN, radio access network, connection status. New sensing procedures with the multi-power classes can be made available, enabling power saving. New UE capabilities and features and status control can be introduced, and new capability information and RRC signaling can also be introduced when the apparatus is connected to a radio access network, e.g., go less frequently to idle. New measurement reports can be made available, when the apparatus is connected to the radio access network.

According to an advantageous example, the second VRU class is selected, if a current speed associated with the lightweight vehicle is above a threshold, and if the coupling state indicates that the apparatus is communicatively coupled with the vehicle-side control unit.

Advantageously, a speed above 6 km/h, for example, for 30 seconds, indicates that the apparatus changes its class to the second class.

According to an advantageous example, the first VRU class is selected, if the current speed associated with the lightweight vehicle is below a threshold, or and if the coupling state indicates that the apparatus is not communicatively coupled to with the vehicle-side control unit.

Advantageously, a speed below 6 km/h, for example, for 30 seconds, indicates that the apparatus changes its class to the first class.

According to an advantageous example, the method comprises: receiving, via a communication channel between the apparatus and a control unit of a vehicle, at least one sensor information associated with a sensor of the vehicle and/or at least one information based thereon; determining at least one status information associated with the vehicle based on the received at least one sensor information; transmitting, via a radio channel, at least one message, especially a V2X message or a VRU message, comprising the determined at least one status information associated with the vehicle, if the second VRU class is selected.

If the second VRU class is selected, then the apparatus and the associated lightweight vehicle are enabled to participate in maneuver coordination with other vehicles or other functionalities increasing road safety.

According to an advantageous example, the method comprises: disabling at least the transmission of the at least one status information associated with the vehicle, if the first VRU class is selected.

Advantageously, power saving is activated if the first VRU class is selected and in this mode, the apparatus does not transmit its trajectories to other network participants.

According to an advantageous example, the at least one status information comprises at least one trajectory associated with the vehicle.

According to an advantageous example, the method comprises: receiving first data of a first payload type via a first plurality of radio resources of a radio channel if the first VRU class is selected; and receiving second data of a second payload type via a second plurality of radio resources of the radio channel if the second VRU class is selected, wherein the first radio resources and the second radio resources are disjoint.

By separating the radio part by the payload type, the radio terminal is enabled to save power according to the selected VRU class.

According to an advantageous example, the method comprises: enabling the reception of the second data via the second plurality of resources, if the second VRU class is selected.

Advantageously, enabling the reception capability enables further functions like maneuver coordination by receiving trajectories from other vehicles.

According to an advantageous example, the method comprises: disabling the reception of the second data via the second plurality of radio resource, if the first VRU class is selected.

Advantageously, disabling the reception capability enables power saving. For example, the reception capability depends on listening to a specific time-frequency part/the second radio resources in the radio domain. Disabling listening on the second radio resources, on which the at least one trajectory of the distant vehicle is transmitted, saves power. On the other side, warnings can be still received on the first radio resources in the radio domain and the radio terminal is able to warn the user by issuing a warning or alter via a human-machine interface.

According to an advantageous example, the first VRU class indicates a pedestrian mode of the apparatus, and wherein the second VRU class indicates a vehicle mode of the apparatus.

According to an advantageous example, the method comprises: receiving, via a radio control channel, a configuration indicating at least a selection permission; and wherein the selecting of the one of the first and second VRU classes is performed, if the received selection permission allows it.

Advantageously, the network controls, whether switching of the VRU class is allowed for the apparatus/mobile terminal being served.

According to a second aspect, the description provides a method for operating a system comprising the apparatus, and a radio access node, the method comprising: transmitting, by means of the radio access node, via a radio control channel, the configuration, in particular a radio resource configuration, indicating selection permission for the apparatus.

Advantageously, the network operator is able to control the switching of the VRU classes.

According to a third aspect of the description, an apparatus comprises: determining means to determine a coupling state that indicates a coupling or non-coupling of the apparatus with a vehicle-side control unit of a lightweight vehicle; and selecting means to select one of at least a first and second VRU class of the apparatus based on the determined coupling state.

BRIEF DESCRIPTION OF THE DRAWINGS

According to a fourth aspect, a system is provided, comprising the apparatus according to the third aspect and the control unit.

DETAILED DESCRIPTION

Figure 1:
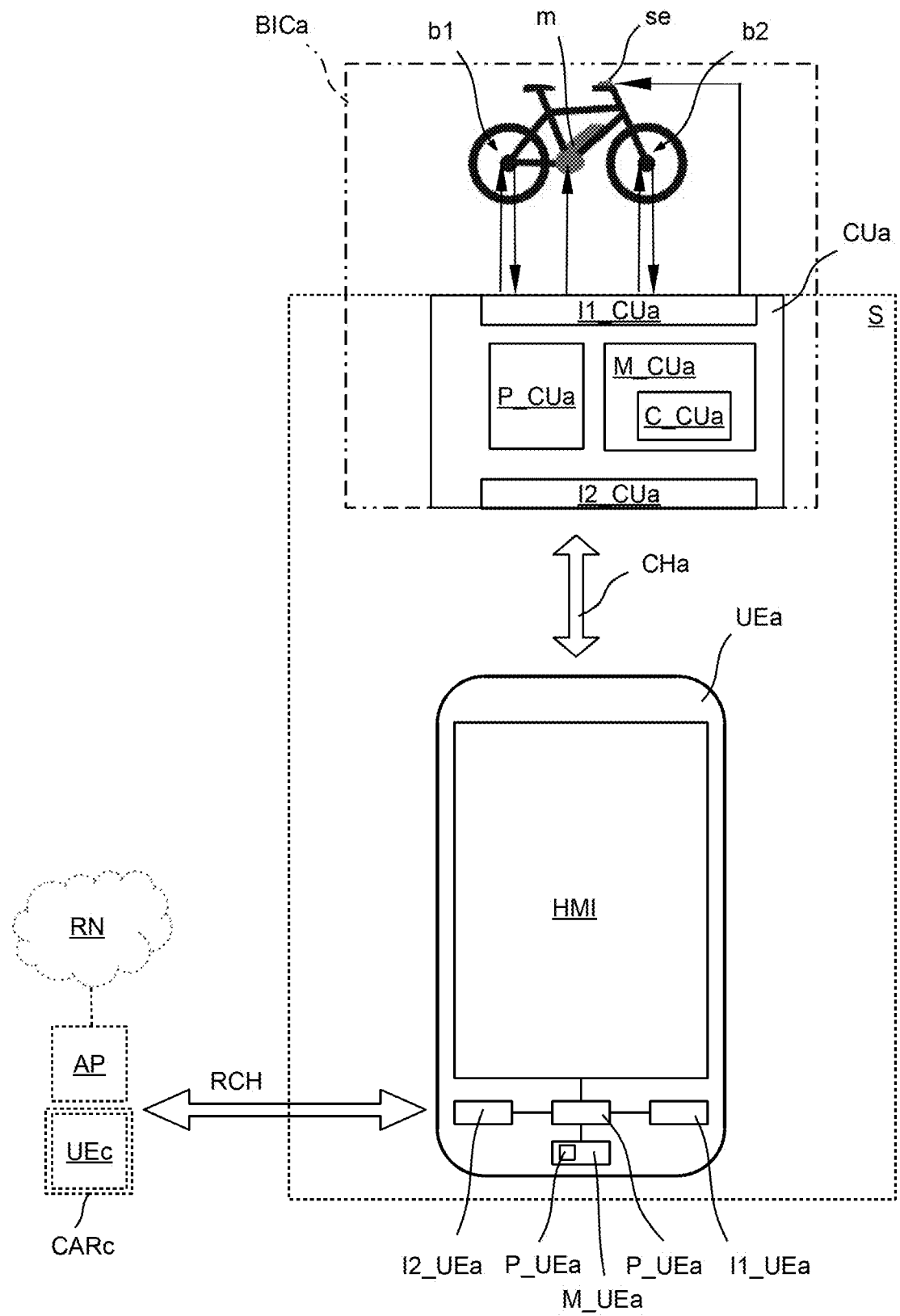
FIG. 1 depicts schematically a block diagram.

FIG. 1 depicts schematically a block diagram. A lightweight vehicle BICa is depicted as a pedal electric bicycle and comprises at least one actuator, at least one sensor, and a control unit CUa. For example, the lightweight vehicle BICa does not exceed 50 kg. The at least one actuator comprises at least one of the following: a brake b1, b2, a motor, and a signalizing entity se. The respective actuator provides at least one of the following functions: brake assistance, motor speed regulation, motor disengaging, alarm light, etc.

The at least one sensor comprises at least one of the following: a sensor for sensing a state of one of the brakes b1, b2; a sensor for sensing a motor state of the motor m, a sensor indicating an operating condition of an external lighting. Accordingly, sensor information may include information from at least one of the following sources: light sensors, brake sensors (e.g., gyro (inertia)-sensor or electronic brakes device (ABS/EBS) or a brake-lever switch/clutch), acceleration sensor, speed sensor, right/left turning sign/axis sensor, battery level sensor, motor vital information sensors.

The control unit CUa comprises a first interface I1_CUa for receiving signals from the at least one sensor and for transmitting at least one operating instruction to the at least one actuator.

The control unit CUa comprises a second interface I2_CUa for communicating via a channel Cha with a personal mobile terminal UEa.

The control unit CUa comprises a memory unit M_CUa, and a processing unit P_CUa. On the non-transitory memory unit M_CUa, a computer program C_CUa is stored. When executing the computer program C_CUa on the processing unit P_CUa, the processing unit P_CUa causes, together with the memory unit M_CUa, and the interfaces I1_CUa and I2_CUa, the control unit CUa to conduct the methods described herein.

The personal mobile terminal UEa comprises a first interface I1_UEa to communicate via the channel CHa with the control unit CUa.

The personal mobile terminal UEa comprises a second interface I2_UEa to communicate via a radio channel RCH with a further radio terminal UEc of another vehicle CARc and/or with an access point AP to communicate with a backhaul entity or another communication entity in a remote network RN. The radio channel RCH can be one of the following: a direct communication channel to a mobile terminal UEc of another vehicle CARc; an uplink or downlink channel to/from the access point AP.

The personal mobile terminal UEa comprises a non-transitory memory unit M_UEa, a human machine interface HMI in form of a touch panel, and a processing unit P_UEa.

On the memory unit M_UEa, a computer program C_UEa is stored. When executing the computer program C_UEa on the processing unit P_UEa, the processing unit P_UEa causes, together with the memory unit M_UEa, and the interfaces I1_UEa and I2_UEa, the personal mobile terminal UEa to conduct the methods described herein.

The personal mobile terminal UEa is adapted to transmit and receive V2X messages (V2X: Vehicle to everything) and/or to transmit and receive VRU messages (VRU: Vulnerable Road User).

Figure 2:
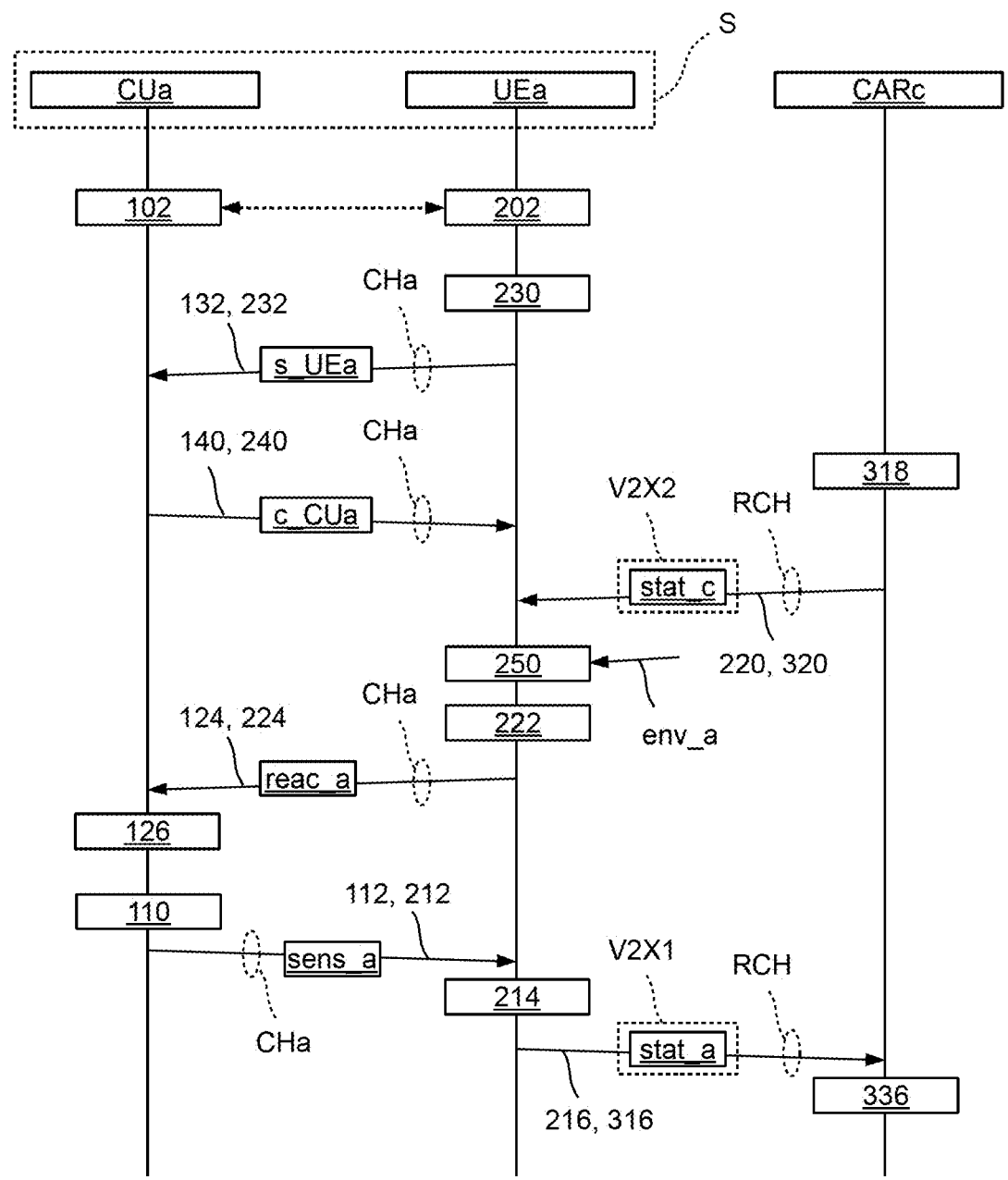
FIGS. 2, 3 and 5 each depict schematically a sequence diagram.

FIG. 2 depicts schematically a sequence diagram. By way of example, the vehicle associated with the control unit CUa is a bicycle and the other vehicle is a car. Of course, the other vehicle can be another bicycle. In another example, the bicycle communicates with a pedestrian-type user terminal.

According to steps 102 and 202, the control unit CUa and the personal mobile terminal UEa interface with each other to provide the communication channel CHa. The personal mobile terminal UEa (e.g., smart phone, tablet) runs an application such that the personal mobile terminal UEa is able to communicate via the communication channel CHA with the control unit CUa. The radio channel CHa has one of the following connectivity options:

Cable, when cable is connected to, e.g., charge the smart device

Near field communication (NFC): exchanging security information, association, and exchange control data, sensor information, and instructions Bluetooth: pairing with the CUa and exchanging data and control Wi-Fi (existing versions or advanced low-power version): used for association and/or sending/exchanging data.

To have a secure connection via communication channel CHa, in order to avoid un-authorized access, an authentication between the CUa and the UEa is conducted. Both a security guard and functional-safety functionalities are implemented in CUa and UEa. Authentication is done between the CUa and the UEa, such that the UEa is able to associate with the CUa via:

a standardized key exchange/sharing, or a secure authentication mechanism running on the on-board device and the smart device application, e.g., the chipset of the CCU-like lower layer part has it so do the application (e.g., a vendor based app and CCU-like chipset)

a legalized e-Mobility ID programmed according licensing the e-Mobility, where the unique Key can associate with the Application (on the smart device UEa) running V2X services.

The further vehicle CARc determines 318 at least one status information stat_c associated with the further vehicle CARc. The status information stat_c comprises, for example, a planned trajectory of the further vehicle CARc. The further vehicle CARc transmits 320 the status information stat_c via the radio channel.

The personal mobile terminal UEa receives (according to receiving means 220), via the radio channel RCH, at least one further message V2X2, especially a V2X message, comprising at least one status information stat_c associated with a further vehicle CARc.

The personal mobile terminal UEa determines (according to determining means 222) at least one reaction information reac_a for the vehicle BICa based on the received at least one status information stat_c associated with the further vehicle CARc.

For example, the determining 222 comprises a comparison of a planned trajectory of the vehicle BICa with a received planned trajectory of the further vehicle, the received trajectory being part of the received status information stat_c.

The personal mobile terminal UEa determines or receives (according to determining or receiving means 250) environment information env_a associated with the personal mobile terminal UEa. The determining 222 of the at least one reaction information reac_a is based on the received at least one status information stat_c of another vehicle CARc and is based on the determined or received environment information env_a.

The environment information env_a comprises, for example, at least one of the following: a weather condition received via a respective service, a position information received from a location sensor of the personal mobile terminal UEa, a temperature received from a sensor of the personal mobile terminal UEa, etc.

The personal mobile terminal UEa transmits (according to transmitting means 224), via the communication channel CHa between the personal mobile terminal UEa and the control unit CUa of the vehicle BICa, the at least one determined reaction information reac_a.

The control unit CUa receives (according to receiving means 110) at least one sensor information sens_a associated with one of the sensors of the vehicle BICa.

The control unit CUa transmits (according to transmitting means 112), via the communication channel CHa between the control unit CUa and the personal mobile terminal UEa, the at least one sensor information sens_a and/or at least an information based thereon.

The personal mobile terminal UEa receives (according to receiving means 212), via the communication channel CHa between the personal mobile terminal UEa and the control unit CUa of the vehicle BICa, the at least one sensor information sens_a associated with a sensor of the vehicle BICa and/or at least one information based thereon.

The personal mobile terminal UEa determines (according to determining or processing means 214) at least one status information stat_a associated with the vehicle BICa based on the received at least one sensor information sens_a.

The personal mobile terminal UEa transmits (according to transmitting means 216), via a radio channel RCH, at least one message V2X1, especially a V2X message, comprising the determined at least one status information stat_a associated with the vehicle BICa.

The status information stat_a comprises: time, position, motion state, activated systems, etc.

After receiving 316 the status information stat_a from the personal mobile terminal UEa, the other vehicle CARC adapts 336 its trajectory accordingly.

According to another example, the personal mobile terminal UEa determines (according to the determining means 214) a trajectory of the vehicle BICa based on the received sensor information sens_a.

According to an example, status information stat_a comprises the determined planned trajectory of the vehicle BICa. The personal mobile terminal UEa determines (according to the determining means 214) the trajectory of the vehicle BICa based on the received sensor information sens_a, compares the determined trajectory with the trajectory received via the status information stat_c. In dependence on the comparison, the trajectory is transmitted as the status information stat_a or a reaction (for transmitting the reaction to the control unit CUa) is determined by the personal mobile terminal UEa.

The control unit CUa receives (according to receiving means 124), via the communication channel CHa between the control unit CUa and the personal mobile terminal UEa, at least one reaction information reac_a for the vehicle BICa.

The control unit CUa operates (according to operating means 126) the vehicle BICa based on the received at least one reaction information reac_a.

The reaction information reac_a comprises at least one of the following: activating or deactivating a braking assisting function, activating or deactivating a warning indicator, activating or deactivating a motor acceleration.

The control unit CUa receives (according to receiving means 132), via the communication channel Cha between the control unit CUa and the personal mobile terminal UEa, the at least one status information s_UEa associated with the personal mobile terminal UEa. The transmitting (according to transmitting means 112), via the communication channel CHa between the control unit CUa and the personal mobile terminal UEa, of the at least one sensor information sens_a and/or at least an information based thereon is based on the at least one status information s_UEa.

For example, the status information s_UEa comprises an upper layer application status like ready, paused, initiating, etc. According to another example, the status information s_UEa comprises a battery status of the personal mobile terminal UEa. According to another example, the status information s_UEa comprises a connectivity status like a sidelink connectivity status, a network connectivity status, etc.

According to an example, the transmitting 112 is conducted, if the status information s_UEa permits the transmission. For example, if the connectivity status of the personal mobile terminal UEa indicates that no connection to another radio entity is available, then the transmission of the sensor information sens_a is ceased and/or listening to receive the reaction information reac_a is disabled.

According to an example, the frequency of the transmitting 112 is reduced, if the status information s_UEa indicates a low battery status of the personal radio terminal UEa. The frequency of the transmitting 112 is increased, if the status information s_UEa indicates a high battery status of the personal radio terminal UEa.

The control unit CUa transmit (according to transmitting means 140), via the communication channel CHa between the control unit CUa of the vehicle BICa and the personal mobile terminal UEa, at least one capability information c_CUa associated with the vehicle BICa.

The capability information c_CUa indicates, for example, which functionalities like an anti-lock braking system, warning signaling entities, brake types, motor types, etc. are available at the vehicle. Based on the capability information c_CUa, the personal mobile terminal UEa is capable to attend a variety of differently configured types of vehicles.

The personal mobile terminal UEa determines (according to determining means 230) at least one status information s_UEa associated with the personal mobile terminal UEa.

The personal mobile terminal UEa transmits (according to transmitting means 232), via the communication channel Cha between the at least one status information s_UEa associated with the personal mobile terminal UEa.

The personal mobile terminal UEa receives (according to receiving means 240), via the communication channel CHa between the personal mobile terminal UEa and the control unit CUa of the vehicle BICa, a capability information c_CUa associated with the vehicle BICa. The determining 222 of the at least one reaction information reac_a for the vehicle BICa is based on the received at least one status information stat_c associated with the further vehicle CARc and on the received capability information c_CUa.

The determined reaction information reac_a may include disengaging the motor, actuating the brake, or signaling a collision alarm to the driver, if a collision risk was determined via the determining 222.

A system S comprises the control unit CUa and the personal mobile terminal UEa.

In the following, we will introduce in details the proposed solutions for upper-layer split, which comprises: 1st an application running on UEa, the application is able to generate messages associated with the vulnerable road user (VRU) services. Then, 2nd VRU services is sent via the communication protocol stack of UEa either to the network or directly to other users. Hence, the software application together with the hardware of UEa establish CCU functionality and perform V2X-like or VRU-eMobility-type services.

For VRU services (generated/handled by the said application) to access the protocol stack and, later, access the communication channel, said application associates with the UEa (e.g., smart phone) communication modules/protocol stack. In this case, the application securely accesses the radio interface/a modem of UEa, allowing access to both Uu (link to the network) communication link and sidelink communication link. In addition, the application may be configured (offline) or pre-configured (by the network) to access the unlicensed/dedicated spectrum and/or licensed bands for Uu/sidelink for V2X/VRU/sidelink communication. Accordingly, the application also receives VRU and V2X messages from the network and/or other users. The communication is initialized with the application that has the right authorization in order to:

Authenticate with communication modules on UEa;
Compile and send VRU/V2X-like messages;
Authenticate the communication protocol stack to communicate to licensed or unlicensed/dedicated band;
Control the communication protocol stack identifying the right category or class of UE for a certain purpose, e.g., VRU-pedestrian, VRU-eBike type, V2X-eLM, etc.;
Indicate the power category for lower layers;
Access the V2X and/or VRU (with different types) services protocol;
Send measurement report, mobility condition (speed, acceleration, . . . ) and localization information over Uu and/or sidelink transmission.

The application of UEa is also capable of associating with CUa using the secure communication channel CHa, which could be a communication via a secure near-field communication (NFC), Bluetooth communication, other secure wireless communication. However, the application of UEa may associate with CUa using the charging cable (or any other cable) connecting the communication port of UEa to the control-board/lower-layer split of CUa. In order to guarantee secure communication (i.e., to be able to send V2X-like messages or VRU messages), the following may be considered:

The secure channel may be using a secure module regulated by the authority, a secure module regulated by a registered identifier, etc.

The application of UEa may use a vendor based secure association, i.e., the mobile application and the e-mobility chipset is from the same vendor.

The application may use a secure standardized key sharing

The application shall securely collect information from the available sensors via the CUa. Additionally, the application shall be able to collect information from the UEa, e.g., location/positioning information, navigation paths, weather conditions, etc. Furthermore, the application shall be able to collect information as received from other road partners, e.g., vehicles, pedestrian, other CUa, including their vulnerable road users awareness messages (VAM), cooperative awareness messages (CAM), cooperative perception messages (CPM), etc.

Based on the information collected from the sensors, information collected from the smart-device sensors, and/or information collected from cooperative awareness/perception messages (e.g., VAM, CAM2 CPM-Like, etc.), the application of UEa instructs, via CUa, the actuators of the vehicle BICa, which are connected to CUa, to perform one or more assisting riding, e.g.:

Assist ABS brakes;
Assist lights/warning; and
Assist motor acceleration/de-acceleration.

The smart phone is connected to the CUa with one or more options, i.e., either wireless or wireline. The personal terminal UEa running the application can have multiple battery status, e.g., charging-high, charging-low, not charging low, not charging-high, etc. The status of UEa includes at least one of the following: battery status, connectivity status (network, sidelink, or both, etc.). The capability information of the CUa comprises at least one of the following: speed monitor, speed control, brakes status, gyro-sensor, or electronic assisted ABS functionality, etc.

Figure 3:
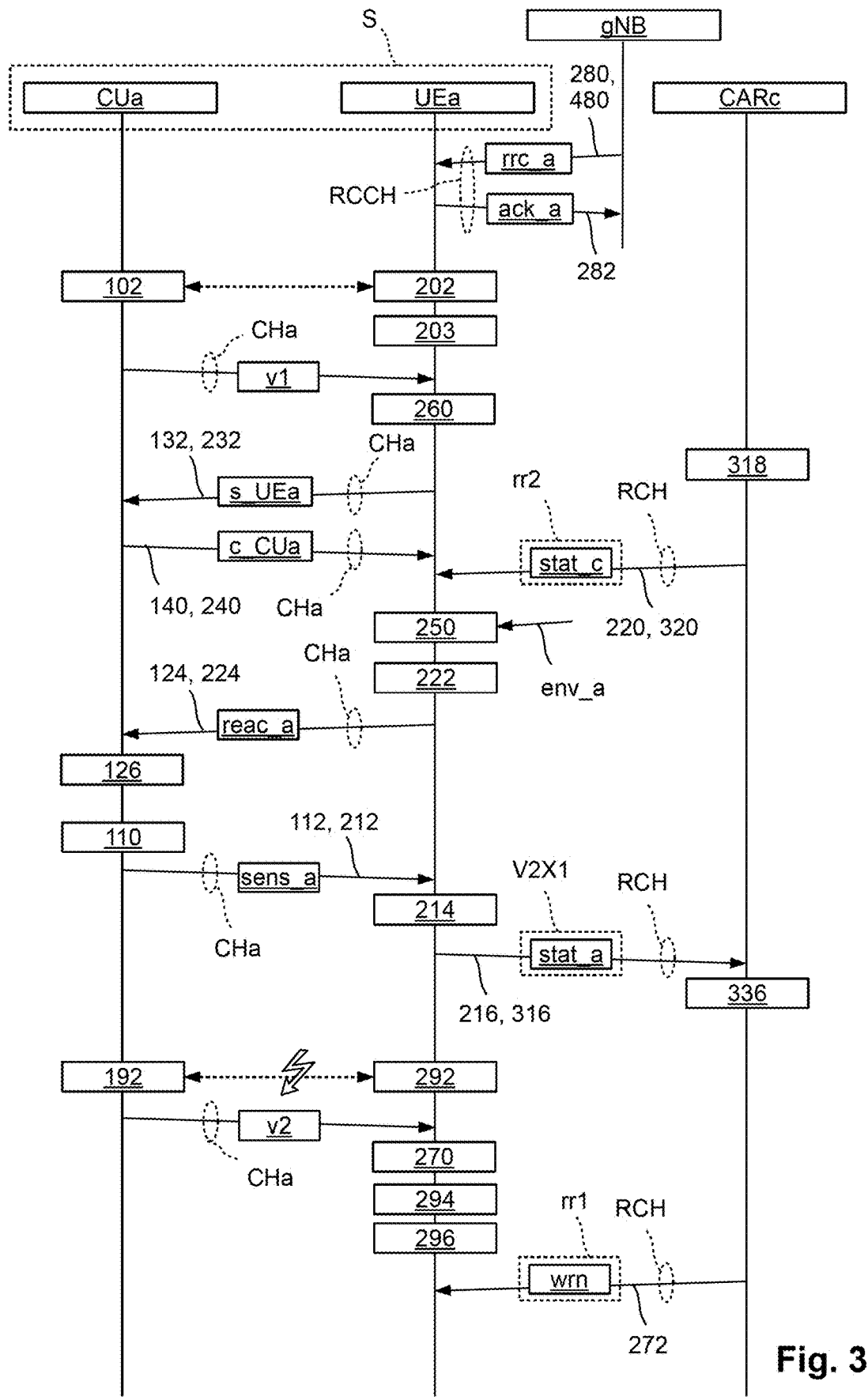

FIG. 3 depicts a schematical sequence diagram. Reference is made to FIG. 2 above with regard to the steps not described below.

The apparatus UEa determines (according to determining means 202, 292) a coupling state that indicates a coupling or non-coupling, in particular a communicative coupling or a communicative non-coupling, of the apparatus UEa with a vehicle-side control unit CUa of a lightweight vehicle BICa. The apparatus UEa selects (according to selecting means 260; 270) one of at least a first and second VRU class of the apparatus UEa based on the determined coupling state. The first VRU class indicates a pedestrian mode of the apparatus UEa, and wherein the second VRU class indicates a vehicle mode of the apparatus UEa. This class/mode can be communicated to other network participants and/or the communication of the apparatus differs when comparing the classes/modes.

For example, the second VRU class is selected 260, if a current speed v1 associated with the lightweight vehicle BICa is above a threshold, and if the coupling state indicates that the apparatus UEa is communicatively coupled with the vehicle-side control unit CUa. The current speed v1 is determined by speed measuring means of the apparatus UEa or the current speed v1 is received from the control unit CUa.

The apparatus UEa enables (according to enabling means 203) the reception of second data like the status information stat_c via a second plurality of resources rr2, if the second VRU class is selected.

The apparatus UEa receives (according to receiving means 212), via a communication channel CHa between the apparatus UEa and a control unit CUa of a vehicle BICa, at least one sensor information sens_a associated with a sensor of the vehicle BICa and/or at least one information based thereon.

The apparatus UEa determines (according to determining or processing means 214) at least one status information stat_a associated with the vehicle BICa based on the received at least one sensor information sens_a.

The apparatus UEa transmits (according to transmitting means 216), via a radio channel RCH, at least one message V2X1, especially a V2X message or a VRU message, comprising the determined at least one status information stat_a associated with the vehicle BICa, if the second VRU class is selected. According to an example, the at least one status information stat_a comprises at least one trajectory associated with the vehicle BICa.

A radio access node gNB provides uplink and downlink channels to the apparatus UEa. Through these uplink and downlink channels, the apparatus UEa is able to communicate with other remote network entities. However, there is also a direct mode, according to which the apparatus UEa directly communicates, for example via a sidelink channel, with other vehicles or their radio interfaces.

The radio access node gNB receives (according to receiving means), via a radio control channel RCCH, at least one capability information associated with the apparatus UEa, from the apparatus UEa. The radio access node gNB determines (according to determining or processing means) the configuration rrc_a in dependence on the at least one capability information.

The radio access node gNB transmits (according to transmitting means 480), via a radio control channel RCCH, the configuration rrc_a, in particular a radio resource configuration, indicating at least one selection permission for the apparatus UEa. The apparatus UEa receives (according to receiving means 280), via the radio control channel RRCH, the configuration rrc_a indicating at least the selection permission. The selecting 260; 270 of the one of the first and second VRU classes is performed, if the received selection permission allows it. The apparatus UEa transmits (according to transmitting means 282) an acknowledgement ack_a, especially an RRC_reconfiguration_complete message to acknowledge the rrc configuration reception, if the configuration rrc_a was correctly received.

According to steps 192 and 292, both the apparatus UEa and the control unit CUa determine that the communication channel CHa has been disconnected. The disconnection could happen with the intense to do so, for example, by actively deactivating via an application on the apparatus UEa. However, the disconnection could also happen without explicit intense, for example, when a distance between the vehicle BICa and the apparatus UE is above a threshold, for example, when parking the vehicle BICa.

In another example, the first VRU class is selected 270, if the current speed v2 associated with the light-weight vehicle BICa is below a threshold, or and if the coupling state indicates that the apparatus UEa is not communicatively coupled to with the vehicle-side control unit CUa. The current speed v2 is determined by speed measuring means of the apparatus UEa or the current speed v2 is received from the control unit CUa.

The apparatus UEa disables (according to disabling means 294) at least the transmission 216 of the at least one status information stat_a associated with the vehicle BICa, if the first VRU class is selected.

The apparatus UEa disables (according to disabling means 296) the reception of the second data via the second plurality of radio resource, if the first VRU class is selected.

The apparatus UEa receives (according to receiving means 272) first data of a first payload type via a first plurality of radio resources rr1 of a radio channel RCH if the first VRU class is selected. The apparatus UEa receives (according to receiving means 220) second data of a second payload type via the second plurality of radio resources rr2 of the radio channel RCH if the second VRU class is selected, wherein the first radio resources rr1 and the second radio resources rr2 are disjoint. The first payload type represents, for example, warning messages. The second payload type represents, for example, maneuver coordination indications like waypoints or trajectories of other vehicles. The apparatus UEa will listen to the first plurality of resources rr1, if the first or second class is selected.

For example, the apparatus UEa as a modem is configured to allow the switch between the at least two VRU classes. The case switching and the triggering can be identified by the connection status/coupling status of the apparatus UEa. The coupling status of UEa can be indicated by whether UEa is associated with the CUa or not associated with CUa but is a pedestrian user equipment (in this case a pure pedestrian UE). In addition, other optional triggering conditions can be defined to validate the category selection of UEa. For example, if UEa is associated to CUa and UEa exceeds a minimum speed (eLM_start_speed), the UEa switches to the second class; otherwise, UEa switches (back) to the first class. In this case, a flexible switching between different Categories may be triggered either by UE internal measurements/reading, network configuration/allowability, UE pre-configuration, etc.

Additionally, multiple features of apparatus UEa can be supported to allow for more fine-tuning the application and services supported by the application fitted on a smart device supporting VRU services, the smart device comprising the apparatus UEa. For example, if UEa is switched to the second class, UEa can support multiple features in which each can be triggered by the UE fine granular status, e.g., speed of vehicle BICa, battery status of BICa, and/or whether a battery of UEa is attached to a charging source from CUa. Herewith, for each VRU-class, multiple features of the apparatus UEa can be supported, e.g., power saving, sidelink connections UE features, DRX adaption on Uu and Sidelink, etc.

The coupling state can be determined based on:
UEa association status to CUa;
reading/information originating from CUa (e.g., speed);
information originating from UEa;
information from application/upper layers (e.g., UE positioning, UE route, etc.).

The different classes may have different status/operation when operating in either licensed bands (Uu and SL) or unlicensed bands (SL). For in-coverage or using licensed bands, UEa, e.g., after association with CUa, may scan existing SIBs (SIB: System Information Block) for the aforementioned class switching. If the gNB supports sidelink (or VRU sidelink) and gNB does not indicate a support for multi-VRU class switching, it may be up to implementation of UEa or up to the pre-configuration of UEa and regulations to select the appropriate class. If gNB supports sidelink (or VRU sidelink) and indicates (e.g., in a SIB) that multi-VRU class switching is supported, gNB may send a broadcast SIB information or dedicated unicast RRC configuration mandating the following (one or more):

Switching conditions to the second class, e.g., as far as UEa is communicatively coupled to CUa and/or when UEa exceeds a certain speed;

Switching conditions to the first class, e.g., as far as UEa is not communicatively coupled to CUa or after UEa is detached to and CUa and/or when UEa does not exceed a certain speed;

Information about allowed Idle, inactive, and active capability for Uu and SL;

Information about supported UE power saving on Uu and SL for each VRU class;

Information about intra-UE prioritization between SL and Uu for each VR class;

Information about allowed SL resource pool configurations for different VRU classes and whether UEa is allowed to access which resource pool after switching to the respective class. Additionally, an RRC configuration may allow UEa to exploit one or more UE features with or without sending a UE assisting information;

Information about allowed Sidelink cast-type, CSI feedback support, HARQ feedback type, and/or HARQ-feedback enable/disable;

Information about allowed low spectral efficiency communication (64-QAM modulation-coding scheme (MCS) for URLLC features) and/or high spectral efficiency MCS tables for non-URLLC services;

Information about radio resources (e.g. configured resource pools) to be used;

Information about supported/allowed UE Uu and SL other physical layer features (e.g., dual connectivity, carrier aggregation, MIMO—beamforming, etc.) in each switchable category (e.g., VRU-CAT2 and VRU-CAT1)

For out-of-coverage or using unlicensed bands, e.g., dedicated bands for VRUs and dedicated bands for V2X communication, UEa may switch to a VRU class based on either implementation (where all triggering conditions are implemented and saved in the non-volatile memory) or based on a pre-configuration information. In such case, the pre-configuration has to allow for:

Switching conditions to the second class, e.g.,
as far as UEa is attached to CUa and/or when UEa exceeds a certain speed (eLM_start_speed), Switching conditions to class, e.g.,
as far as a UE is not attached to CUa or after UEa is detached to and CUa and/or when UEa does not exceed a certain speed (eLM_start_min)

Information about supported/allowed sidelink feature in each switchable category (e.g., first and second VRU class)

Information about supported UEa power saving on SL, SideLink, transmission for each VRU class Information about allowed SL resource pool configurations for different VRU classes and whether UEa is allowed to access which one after switching to the respective class.

Information about allowed sidelink cast-type, CSI feedback support, HARQ feedback type, and/or HARQ-feedback enable/disable Information about allowed low spectral efficiency modulation table for URLLC services and/or high spectral efficiency modulation-coding scheme (MCS) tables for non-URLLC services Information about radio resources (e.g. configured resource pools) to be used Information about supported/allowed UE Uu and SL other physical layer features (e.g., dual connectivity, carrier aggregation, MIMO—beamforming, etc.) in each switchable class.

Additional information may be included per VRU class per UE VRU allowed feature in SL.

For partial coverage (or using licensed and unlicensed band), UEa may be configured with a common resource pool(s), where the common resource pool could be configured and/or pre-configured by the network. In this case, similar information as above is envisaged.

In another example, UEa may define multiple features for each (or based on each) VRU class. These UE features can be on:

Sidelink features differences between the VRU classes, e.g., (and not limited to)

Receiving sidelink: supported physical channels, supported frequency bands, supported SCS, supported bi-directional symbols split (e.g., for RX then TX-feedback within a slot), supported different reference symbols, supported RX MCS decoding, supported of HARQ feedback, support of HARQ type and/or Cast type, etc.

Transmitting sidelink:
support of Mode 1 (dynamic grants and/or configured grants), support of Mode 2 (dynamic resource allocation and periodic reservations), etc.

support of HARQ enabling/disabling, support of Cast type, support of CBR measurements, support of congestion control, support of sensing, adaptive sensing, partial sensing, no sensing etc.

Support of different Rank number (>1) and MIMO operation

The supported subcarrier spacing (SCS) and cycle prefix (CP)

Supported power control mechanism

Support of NR and/or LTE (Uu and/or Sidelink)

Supported HARQ feedback time budget, CBR time budget, etc.

Support of CSI feedback with or without multiple antenna

Support sidelink positioning on TX (positioning control signals/frames and positioning reference symbols) and RX (positioning reference symbols decoding and positioning computation), positioning accuracy, etc.

URLLC service and/or non-URLLC services

Supported UE relative speeds receiving accuracy

Supported sidelink Bandwidth part and multiple bands and/or multiple Bandwidth part operation Support sidelink carrier frequency Supported power saving class/mode, e.g., adaptive DRX, cross-slot scheduling on sidelink, micro-sleeps, Wake-up signals, etc.

Uu (communication with a network) UE features differences between VRU CAT1 and VRU-CAT2, e.g., Sidelink and Uu intra-UE prioritization Support of URLLC services Support of multiple bands/Carrier Aggregation/dual-connectivity and multiple bandwidth part Support of in-charge-only battery/power operation Supported different power saving class/features (e.g., DRX adaptation for sidelink transmission, DRX adaption for Uu transmission, Cross-slot scheduling for Uu-UL/Uu-DL/SL, UE-assisting information message content.

Different UE assisting information with different capabilities

Based on VRU classes selection/switching, new multi-power classes, power saving operation, and/or power saving UE features are available to the apparatus UEa, i.e., depending on its coupling status and further possible triggering conditions. In addition, some other status can be considered after coupling, e.g., if UEa is in charging mode by CUa or not, CUa battery status, connection status, UE position, UE route, UE speed, etc.

For power saving, some possible UE features may vary between VRU classes, e.g.,

DRX adaptation for sidelink transmission, DRX adaption for Uu transmission, etc.

Cross-slot scheduling for Uu-UL/Uu-DL/SL,

UE-assisting information message content, i.e., indicating CAT switch and supported UE-features under each CAT).

If UEa is connected to a network, the base station may broadcast allowing multi-VRU class switching a system information block (SIB) as indicated before, one or more information may indicate the capability of, e.g., adapting DRX/adapting power saving mechanism. In this case, further RRC message can be transmitted considering different adapting DRX/power-saving control values for the multi-VRU classes on sidelink. However, if UEa is out of coverage, the different adapting DRX/power-saving control values may be configured using pre-configurations.

Figure 4:
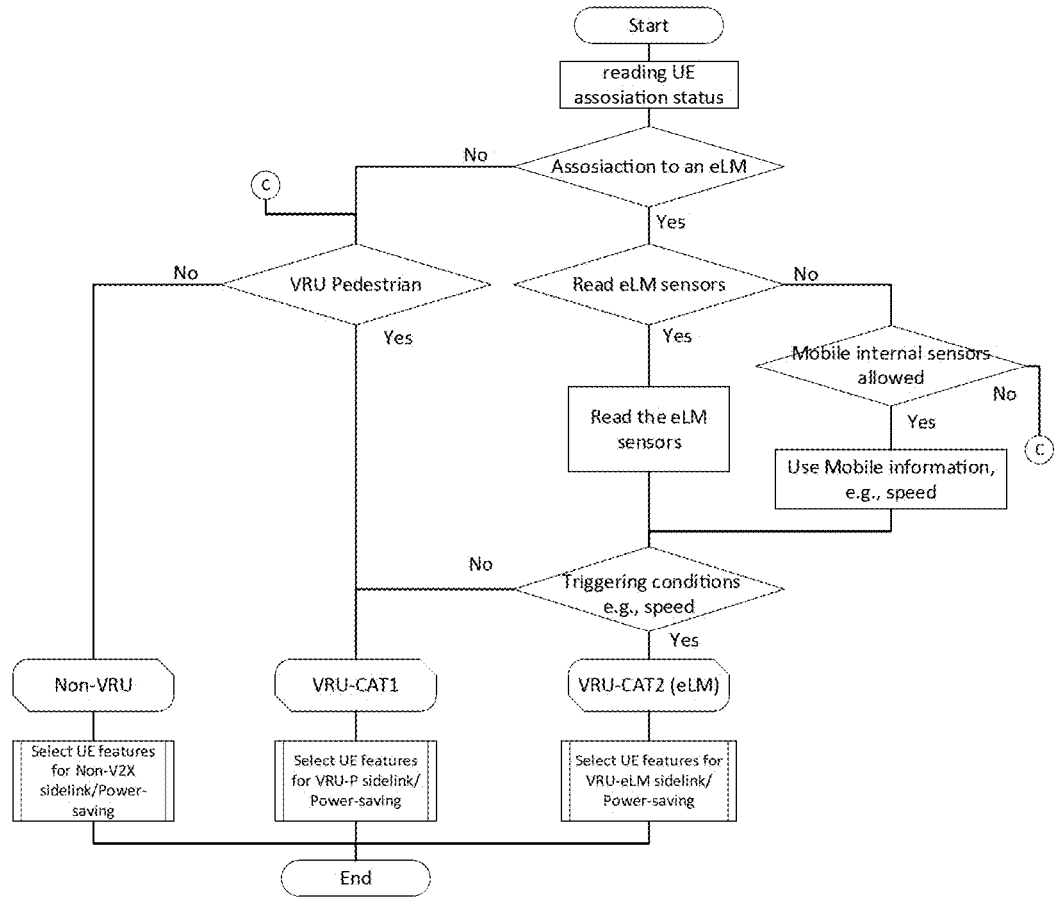
FIG. 4 depicts a schematic flow chart.

FIG. 4 depicts a schematic flow chart illustrating a UE category switching/selection that is triggered (starting) by whether the UE is associated with the control unit or not and (if configured) if triggering condition(s) is/are satisfied.

Figure 5:
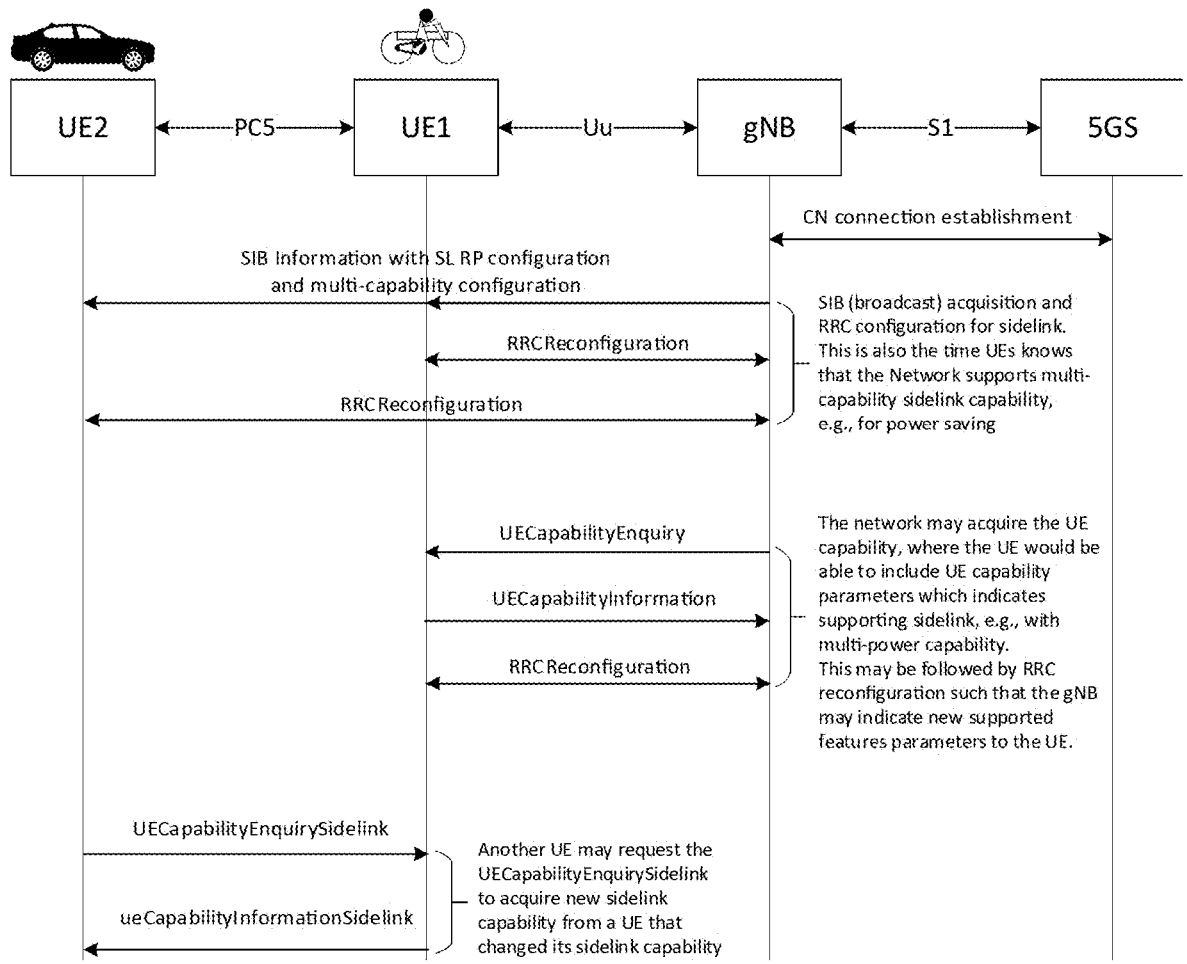

FIG. 5 depicts a schematic sequence diagram. The base-station (gNB) starts with system information block (SIB) broadcasting indicating if the cell support sidelink and the supported resource pool configurations. Additionally, an RRC configuration will be sent to at least some UEs indicating UE-specific sidelink communication procedures. In this example, if the gNB supports the handling of UE sidelink with multiple sidelink capabilities, e.g., multi-capability for sidelink power saving and other sidelink capability for advanced VRU/V2X-likde services, the gNB shall inform the UEs that the network supports such a feature on SIB broadcast or on the specific RRC reconfiguration (i.e., optionally for those UEs who may support it, e.g., smart devices attached to eLMs).

In 5G (New radio (NR), the UE will not signal to the gNB its category to but rather it will signal back its supported UE features and capabilities (e.g., UE capability information elements). However, the UE capability will still be used for marketing issues. The network initiates UE capability information acquisition using the UECapabilityEnquiry information element (IE), where the UEs are allowed to send back their UECapabilityInformation IE including different UE capability parameters, e.g., general, MAC, PHY parameters. Herein, the UEs shall include in the UECapabilityInformation capability parameters indicating to the gNB its support for sidelink multi-capabilities. These parameters could be, e.g.:

a general parameter or a MAC or a Phy specific parameter indicating this capability clearly: e.g., multiV2XCapabilitySupport, multiSLCapabilitySupport or Specific requirements (each in a single parameters) indicating the UE different supported supporting sidelink capability, e.g.,
  Adaptive multi-SL DRX cycles
  Adaptive SL power classes
  Adaptive sidelink BWP
  Adaptive SL switching time (UL/SL, SL-TX, SL-RX)
  Multiple feedback Support for SL etc.

After the UE sends this/these parameter(s) and the network receives it/them, the gNB initiates an RRC reconfiguration, in which the gNB may indicate to the said UE new supported features and parameters according to the UE's identified sidelink capability.

Additionally, another second UE (e.g., a vehicle or another eLM+smart-device) may request the first UE (eLM) to indicate its capability for accepting some advanced use-case, e.g., exchanging cooperative perception messages in case of unicast and group cast communication. In this case, the second UE (vehicle) may send to the first UE (eLM) a UECapabilityEnquirySidelink to acquire new sidelink capability from a UE that just changed its sidelink capability. Herewith, the first UE shall answer with a UECapabilityInformationSidelink including its support for sidelink multi-capability (e.g., multiSLCapabilitySupport) or the specific new supported features, e.g., adaptive sensing and adaptive DRX cycles.

The invention claimed is:

1. A method for operating a portable electronic device (UEa), the method comprising:
   determining (202; 292), via the portable electronic device (UEa), a coupling state that indicates a communicative coupling or communicative non-coupling of the portable electronic device (UEa) with a vehicle-side control unit (CUa) of a lightweight vehicle (BICa); and
   automatically selecting (260; 270) one of at least a first and second VRU, Vulnerable Road User, class of the portable electronic device (UEa) based on the determined coupling state,
   wherein the method further includes receiving (280), via a radio control channel (RRCH), a configuration (rrc_a) indicating at least a selection permission; and
   wherein the selecting (260; 270) of the one of the first and second VRU classes is performed according to the received selection permission.

2. The method according to claim 1, wherein the second VRU class is selected (260), if a current speed (v1) associated with the light-weight vehicle (BICa) is above a threshold, and if the coupling state indicates that the portable electronic device (UEa) is communicatively coupled with the vehicle-side control unit (CUa).

3. The method according to claim 2, wherein the first VRU class is selected (270), if the current speed (v2) associated with the light-weight vehicle (BICa) is below a threshold, or and if the coupling state indicates that the portable electronic device (UEa) is not communicatively coupled to with the vehicle-side control unit (CUa).

4. The method according to claim 1 comprising:
   receiving (212), via a communication channel (CHa) between the portable electronic device (UEa) and a control unit (CUa) of a vehicle (BICa), at least one sensor information (sens_a) associated with a sensor of the vehicle (BICa) and/or at least one information based thereon;
   determining (214) at least one status information (stat_a) associated with the vehicle (BICa) based on the received at least one sensor information (sens_a);
   transmitting (216), via a radio channel (RCH), at least one message (V2X1) comprising the determined at least one status information (stat_a) associated with the vehicle (BICa), if the second VRU class is selected.

5. The method according to claim 4 comprising:
   disabling (294) at least the transmission (216) of the at least one status information (stat_a) associated with the vehicle (BICa), if the first VRU class is selected.

6. The method according to one of the claim 4, wherein the at least one status information (stat_a) comprises at least one trajectory associated with the vehicle (BICa).

7. The method according to claim 1 comprising
   receiving (272) first data of a first payload type via a first plurality of radio resources (rr1) of a radio channel (RCH) if the first VRU class is selected; and
   receiving (220) second data of a second payload type via a second plurality of radio resources (rr2) of the radio channel (RCH) if the second VRU class is selected, wherein the first radio resources (rr1) and the second radio resources (rr2) are disjoint.

8. The method according to claim 7 comprising
   enabling (203) the reception of the second data via the second plurality of resources (rr2), if the second VRU class is selected.

9. The method according to claim 7 comprising
disabling (296) the reception of the second data via the second plurality of radio resource, if the first VRU class is selected.

10. The method according to claim 1, wherein the first VRU class indicates a pedestrian mode of the portable electronic device (UEa), and wherein the second VRU class indicates a vehicle mode of the portable electronic device (UEa).

11. The method according to claim 1
wherein the configuration (rrc_a) is determined based on a capability information associated with the portable electronic device (UEa).

12. A method for operating a system comprising the portable electronic device (UEa) according to claim 1, and a radio access node (gNB), the method comprising:
transmitting (480), by means of the radio access node (gNB), via the radio control channel (RCCH), the configuration (rrc_a) indicating selection permission for the portable electronic device (UEa).

13. A portable electronic device (UEa) comprising
determining means (202; 292) of the portable electronic device (UEa) configured to determine a coupling state that indicates a communicative coupling or communicative non-coupling of the portable electronic device (UEa) with a vehicle-side control unit (CUa) of a lightweight vehicle (BICa); and
selecting means (260; 270) configured to automatically select one of at least a first and second VRU, Vulnerable Road User, class of the portable electronic device (UEa) based on the determined coupling state,
wherein the portable electronic device (UEa) is configured to receive, via a radio control channel (RRCH), a configuration (rrc_a) indicating at least a selection permission, and
wherein selecting (260; 270) of the one of the first and second VRU classes is performed according to the received selection permission.

14. A system(S) comprising:
a vehicle-side control unit (CUa) of a lightweight vehicle (BICa);
determining means (202; 292) of a portable electronic device (UEa) configured to determine a coupling state that indicates a communicative coupling or communicative non-coupling of the portable electronic device (UEa) with the vehicle-side control unit (CUa); and
selecting means (260; 270) configured to automatically select one of at least a first and second VRU, Vulnerable Road User, class of the portable electronic device (UEa) based on the determined coupling state,
wherein the portable electronic device (UEa) is configured to receive, via a radio control channel (RRCH), a configuration (rrc_a) indicating at least a selection permission, and
wherein selecting (260; 270) of the one of the first and second VRU classes is performed according to the received selection permission.

* * * * *